United States Patent
Suzuki et al.

(10) Patent No.: US 6,260,286 B1
(45) Date of Patent: Jul. 17, 2001

(54) MICROMETER

(75) Inventors: Masamichi Suzuki; Shuuji Hayashida; Seigo Takahashi, all of Kanagawa (JP)

(73) Assignee: Mitutoyo Corporation, Tokyo (JP)

( * ) Notice: Subject to any disclaimer, the term of this patent is extended or adjusted under 35 U.S.C. 154(b) by 0 days.

(21) Appl. No.: 09/276,814

(22) Filed: Mar. 26, 1999

(30) Foreign Application Priority Data

Apr. 3, 1998 (JP) .................................................. 10-091744

(51) Int. Cl.$^7$ ...................................................... G01B 3/18
(52) U.S. Cl. ................................................. 33/813; 33/831
(58) Field of Search .............................. 33/813, 814, 815, 33/817–819, 821, 825, 827–831

(56) References Cited

U.S. PATENT DOCUMENTS

| | | | |
|---|---|---|---|
| 797,745 | * | 8/1905 | Pitman .................................... 33/815 |
| 1,143,007 | * | 6/1915 | Wilcox .................................... 33/815 |
| 2,472,126 | * | 6/1949 | Robinson ................................ 33/815 |
| 2,665,490 | * | 1/1954 | Zelnick ................................... 33/815 |
| 3,810,310 | * | 5/1974 | Morgan ................................... 33/816 |
| 4,168,575 | * | 9/1979 | Sugizaki et al. ....................... 33/816 |
| 4,419,824 | * | 12/1983 | Oberhans ............................... 33/813 |
| 4,437,241 | * | 3/1984 | Lemelson ............................... 33/818 |
| 4,532,711 | * | 8/1985 | Shirai ..................................... 33/813 |
| 4,553,330 | * | 11/1985 | Yamauchi et al. ..................... 33/815 |
| 4,561,185 | * | 12/1985 | Sakata et al. .......................... 33/817 |
| 4,578,868 | * | 4/1986 | Sasaki et al. .......................... 33/819 |
| 5,421,101 | * | 6/1995 | Rank ...................................... 33/813 |
| 5,495,677 | | 3/1996 | Tachikake et al. .................... 33/784 |
| 5,829,155 | | 11/1998 | Takahashi et al. .................... 33/813 |

FOREIGN PATENT DOCUMENTS

| 0 716 290 A2 | | 6/1996 | (EP) . |
|---|---|---|---|
| 26802 | * | 2/1986 | (JP) ..................................... 33/815 |

* cited by examiner

*Primary Examiner*—Diego Gutierrez
*Assistant Examiner*—Yaritza Guadalupe
(74) *Attorney, Agent, or Firm*—Oliff & Berridge PLC.

(57) ABSTRACT

A micrometer includes: a main body having an anvil at one end thereof, a spindle having a screwed portion engaging an opposite end of the main body and being displaceable in an axial direction and with respect to the anvil in conjunction with rotation of the spindle, and an encoder detecting an axial displacement amount of the spindle from a rotation amount of the spindle, so that a measurement value based on an output signal of the encoder is digitally displayed. The micrometer includes a thimble provided on the opposite end of the main body and the thimble is rotatable about the axis of the spindle at a predetermined position in the axial direction of the spindle. The thimble is formed with a guide groove parallel with the axial direction of the spindle in an inner peripheral surface thereof. The spindle includes an engagement pin located in the spindle and slidably engaging with the guide groove of the thimble.

9 Claims, 7 Drawing Sheets

MICROMETER

BACKGROUND OF THE INVENTION

1. Field of the Invention

This invention relates to a micrometer of a digital display type. More particularly, the invention relates to a micrometer having a spindle that is displaced in the axial direction during rotation that intends cost reduction, operability improvement, and accuracy improvement.

2. Description of the Related Art

As compared with a measuring instrument of a mechanical graduation display type, a measuring instrument of an electronic digital display type has become pervasive in general measuring instruments in view of the advantage of the superior precision and ease of reading.

Digital display in which a rotary encoder is built is increasingly adopted for a micrometer of a type wherein a spindle displaces in the axial direction while it rotates with rotation of a thimble.

A related digital display type micrometer has a structure including a complete mechanical graduation display mechanism so that it can be used even if the lifetime of a power source (battery) for driving an encoder for detecting the displacement amount of a spindle as an electric signal, electric circuitry, a digital display, etc., comes to an end. That is, the micrometer includes a structure wherein an outer sleeve and a thimble are provided on the frame side and the spindle side respectively, a main scale graduation is formed along the axial direction of the outer circumference of the outer sleeve, and an vernier scale graduation is formed along the outer circumference of the thimble. As a result, the related micrometer provides the disadvantages of complicated assembly and high costs.

In the related structure, there is also the disadvantage for measurement in that, for example, if the operator holds a measured object by left hand, grasps the frame by right hand, and displaces the spindle away from an anvil while turning a ratchet knob with the thumb and forefinger of the right hand, the ratchet knob moves away from the frame gradually and thus the micrometer becomes difficult to handle when the spindle is displaced largely.

Then, the applicant previously proposed a micrometer overcoming the above disadvantages (refer to U.S. Pat. No. 5,829,155).

This micrometer includes a U-shaped frame having an anvil at one end, a spindle screwed into an opposite end of the frame and displaced in the axial direction with the screwed rotation thereof, an encoder for detecting the axial displacement amount of the spindle from the rotation amount of the spindle, and a digital display for digitally displaying the measurement value based on an output signal of the encoder. The micrometer further includes a thimble provided at the opposite end of the frame and being rotatable around an axis of the spindle at an axially constant position of the spindle. Further, a ratchet mechanism is placed between the thimble and the spindle for transmitting the rotation of the thimble to the spindle and allowing the axial displacement of the spindle, and when a predetermined or more load is put on the spindle, causing the thimble to be raced with respect to the spindle.

According to the micrometer thus structured, the main scale graduation, vernier scale graduation, and the like of the related micrometer are omitted, so that the costs required for working the graduations, etc., can be reduced. Moreover, the outer sleeve for forming the main scale graduation can also be made unnecessary, thus the number of parts and the number of assembly steps can be decreased. Therefore, the costs can be reduced.

In the measurement, if the thimble is rotated, the rotation of the thimble is transmitted via the ratchet mechanism to the spindle, so that the spindle is displaced in the axial direction. At this time, even if the spindle is displaced away from the anvil, the thimble is rotatably placed at the constant position of the frame, the thimble is not displaced with the spindle. Accordingly, even if the spindle is displaced largely, a disadvantage of degrading the operability does not arise.

However, in the structure of the related digital display type micrometer, the ratchet mechanism is constructed by a ratchet ring fixed in the thimble and having a serrated protrusion on the inner peripheral surface and a plate spring inserted between the ratchet ring and the outer peripheral surface of the spindle (the outer peripheral surface formed with an external thread). Additionally, the plate spring is retained in a V groove formed along the axial direction of the outer peripheral surface of the spindle at one end and is pressed and urged by the serrated protrusion of the ratchet ring at an opposite end. Namely, the spindle has a structure that the V groove is formed along the axial direction of the outer peripheral surface formed with the external thread.

In such a structure, when the spindle rotates, the V groove formed on the outer peripheral surface of the spindle acts as a tap for thread working an internal thread on the frame side, which threadably engages with the external thread of the spindle. Thus, as the micrometer is used, a clearance is produced between the external thread and the internal thread, causing the degradation of the precision of the micrometer.

SUMMARY OF THE INVENTION

It is therefore an object of the invention to provide a micrometer of a type wherein a spindle displaces in the axial direction during the rotation that high precision can be guaranteed over a long term while maintaining the advantages of cost reduction and operability.

To the end, according to the invention, there is provided a micrometer includes: a main body having an anvil at one end thereof, a spindle having a screwed portion engaging an opposite end of the main body and being displaceable in an axial direction and with respect to the anvil in conjunction with rotation of the spindle, and an encoder detecting an axial displacement amount of the spindle from a rotation amount of the spindle, so that a measurement value based on an output signal of the encoder is digitally displayed. The micrometer includes a thimble provided on the opposite end of the main body and the thimble is rotatable about the axis of the spindle at a predetermined position in the axial direction of the spindle. The thimble is formed with a guide groove parallel with the axial direction of the spindle in an inner peripheral surface thereof. The spindle includes an engagement pin located in the spindle and slidably engaging with the guide groove of the thimble.

According to the structure, when the thimble is rotated, the rotation of the thimble is transmitted to the spindle through the guide groove and the engagement pin. Therefore, the rotation of the thimble can be transmitted to the spindle without forming a groove, etc., along the axial direction of the outer peripheral surface of the spindle as in the related micrometer. Thus, the disadvantage involved in the V groove can be overcome. That is, the disadvantage that the V groove formed in the outer peripheral surface of the spindle acts as a tap for thread working and a clearance is produced between an external thread and an internal thread, causing the degradation of the precision of the micrometer can be overcome. Therefore, high precision can be guaranteed over a long term.

Since a scale graduation, an outer sleeve, and the like are not required, the number of parts and the number of assembly steps can be decreased for reducing the costs. The thimble is rotatably provided at the constant position of the main body, namely, does not displace together with the spindle. Thus, even if the spindle is displaced largely, the degradation of the operability does not arise. Therefore, the advantages of cost reduction and operability can be maintained.

In the described micrometer, a constant-pressure mechanism for causing the engagement pin to be raced with respect to the spindle when a predetermined or more load is applied to the spindle, and the constant-pressure mechanism being provided between the spindle and the engagement pin.

According to the structure, if a measured object is provided between the spindle and the anvil and a predetermined or more load is applied to the spindle, the engagement pin races with respect to the spindle 13, namely, the thimble races. Thus, measurement can always be executed under constant measuring pressure. Thus, highly accurate measurement can be guaranteed.

The constant-pressure mechanism may include: a support shaft, a first rotation transmission ring, a second rotation transmission ring, and an urging unit. The support shaft is disposed on a base end of the spindle coaxially therewith. The first rotation transmission ring is rotatably provided on the support shaft and has the engagement pin on an outer peripheral surface and a first serrated protrusion on a side thereof along a circumferential direction. The second rotation transmission ring is provided on the support shaft unrotatably and axially movably with respect to said support shaft, and has a second serrated protrusion along a circumferential direction on a side opposed to the first serrated protrusion of the first rotation transmission ring. The second serrated protrusion engages with said first serrated protrusion of the first rotation transmission ring. The urging unit urges the second rotation transmission ring toward the first rotation transmission ring.

According to the structure, the measuring pressure can be changed to any desired magnitude simply by replacing the urging means. Therefore, the measuring pressure can be changed easily.

Alternatively, the constant-pressure mechanism may include, a support shaft, a ratchet ring and a plate spring. The support shaft is disposed on a base end of the spindle coaxially therewith. The ratchet ring is rotatably provided on an outside of the support shaft and has the engagement pin on an outer peripheral surface and a serrated protrusion on an inner peripheral surface. The plate spring is inserted between the inner peripheral surface of the ratchet ring and an outer peripheral surface of the support shaft. The plate spring includes one end retained in the outer peripheral surface of the support shaft and an opposite end pressed and urged against the serrated protrusion of the ratchet ring.

According to the structure, the constant-pressure mechanism is structured with the three parts of the support shaft, the ratchet ring, and the plate spring, thus the number of parts is small, assembly is also easy, and the costs can be reduced.

In the structure, preferably the thimble includes a cylindrical body rotatably supported about the axis of the spindle on the opposite end side of the main body, and a cap having the guide groove in an inner peripheral surface and closing one end of the cylindrical body. The cylindrical body and the cap are integrally made of a resin.

According to the structure, the cylindrical body and the cap are made integrally of a resin, so that weight can be saved and the number of parts can be reduced. Further, since the spindle can be hermetically sealed on the base end side, a dustproof and waterproof structure can be provided as a simple structure.

In this case, preferably a seal member is intervened in a joint part between the main body and an opening of the cylindrical body opposite to the cap.

In doing so, the joint part of the main body and one end opening of the cylindrical body (sleeve) can put into a completely dustproof and waterproof structure, so that the adverse effect on the encoder provided therein can be excluded as much as possible.

DETAILED DESCRIPTION OF THE PREFERRED EMBODIMENTS

Referring now to the accompanying drawings, a description will be given of one embodiment of the invention.

Figure 1:
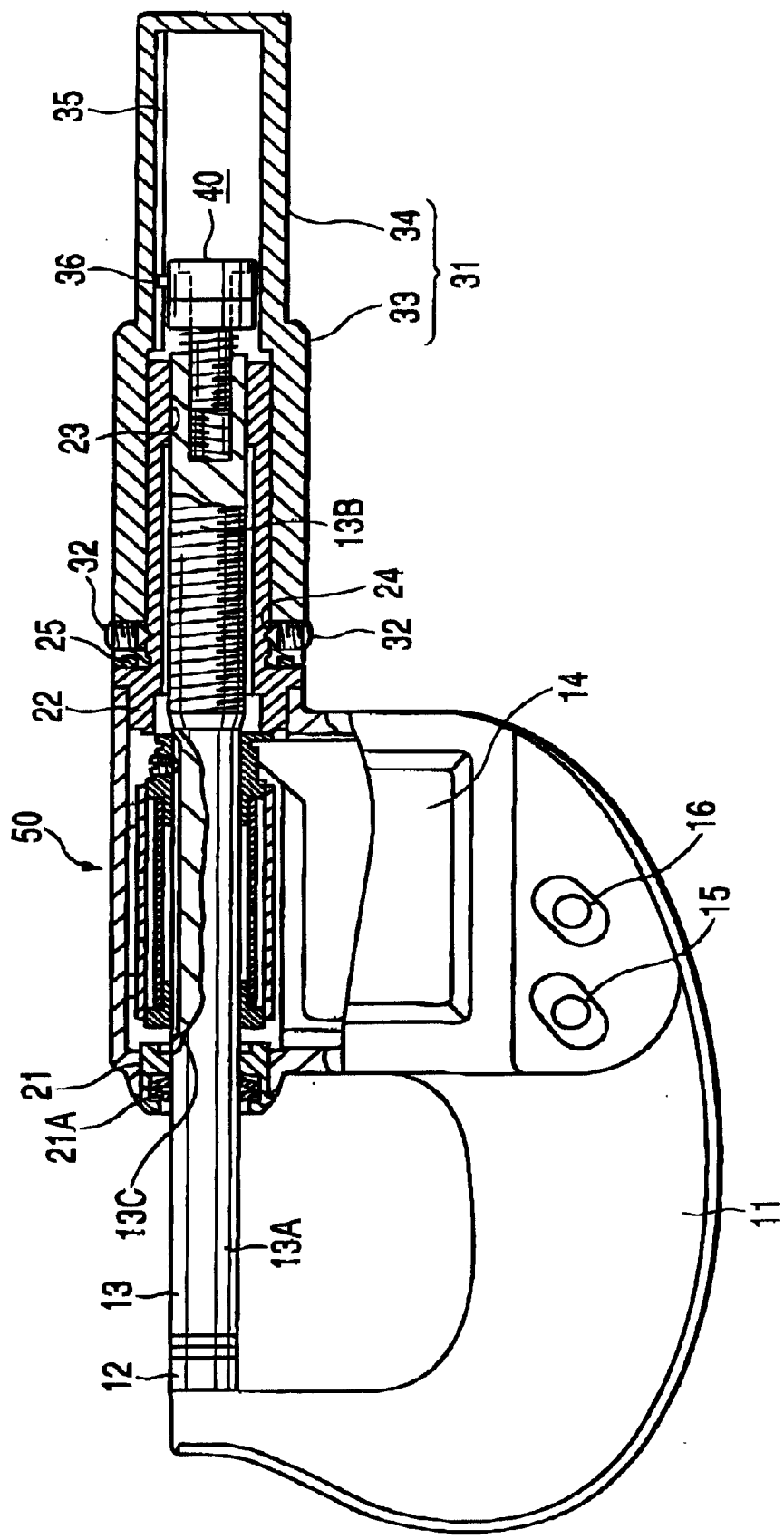
FIG. 1 is a partially cutaway front view showing one embodiment of a micrometer according to the invention.

FIG. 1 is a partially cutaway view showing a micrometer according to an embodiment of the invention. In the figure, an anvil 12 is fixed to the inner face of one end of a frame 11 having a substantially U-shape configuration as a main body, and a spindle 13 moving toward and away from the anvil 12 while axially displacing is located in an opposite end of the frame 11. Reference numeral 14 designates a digital display for digitally displaying the displacement amount of the spindle 13; 15, a zeroing switch; 16, a unit (in/mm) change switch.

In the opposite end of the frame 11 where the spindle 13 is disposed, a bushing 21 having a seal member 21A therein is located in an inner end side thereof, and one end of a sleeve 22 is fitted to an outer end side thereof. There is formed an internal thread 23 in an inner surface of an opposite end of the sleeve 22, and the spindle 13 is screwed into the internal thread 23.

The spindle 13 includes a shaft part 13A slidably supported on the bushing 21 and a threaded part 13B which is of a slightly larger diameter than that of the shaft part 13A and is formed on the outer peripheral surface with a external thread screwed into the internal thread 23. A V-shaped groove 13C is formed along an axial direction from an intermediate point of the shaft part 13A to a point before the threaded part 13B. This means that the groove 13C is not formed in the threaded part 13B in the embodiment.

A cylindrical thimble 31 is placed on an outer periphery of the sleeve 22 so that it can rotate about an axis of the spindle 13. In addition, a V-shaped groove 24 slidably engaging with a tip point part of a retention screw 32 screwed into the thimble 31 is formed along a circumferential direction on the outer periphery of the sleeve 22. Therefore, the thimble 31 is rotatably located about the axis of the spindle 13 at an axially constant position of the spindle 13. A seal member 25 is intervened on the joint face between one end face of the thimble 31 and the sleeve 22. The thimble 31 includes a cylindrical body 33 rotatably supported about the axis of the spindle 13 on the outer periphery of the sleeve 22, and a cap 34 integrally formed at an opposite end of the cylindrical body 33 so as to close an opposite end of the spindle 13. The whole of the thimble 31 is formed of a synthetic resin.

The cap 34 is formed in the inner peripheral surface with a guide groove 35 in parallel with the axial direction of the spindle 13. Further, in the inner peripheral surface of the cap 34, an engagement pin 36 slidably engaging with the guide groove 35 is projectingly provided on the opposite end of the spindle 13. Disposed between the spindle 13 and the engagement pin 36 is a constant-pressure mechanism 40 for causing the engagement pin 36 to be raced with respect to the spindle 13 when a predetermined or more load is applied to the spindle 13.

Figure 2:
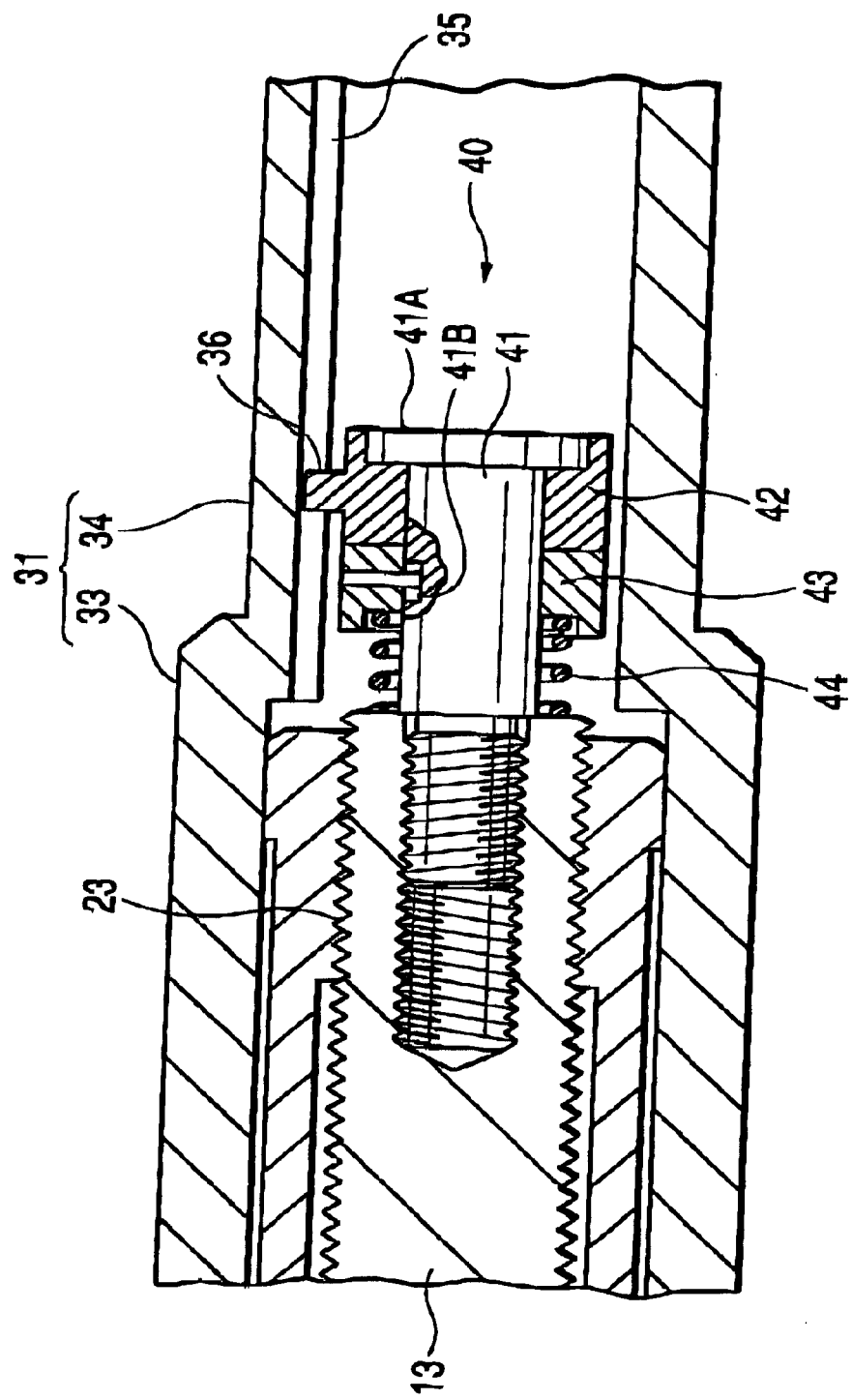
FIG. 2 is an enlarged view showing a constant-pressure mechanism of the micrometer according to the embodiment.
Figure 3:
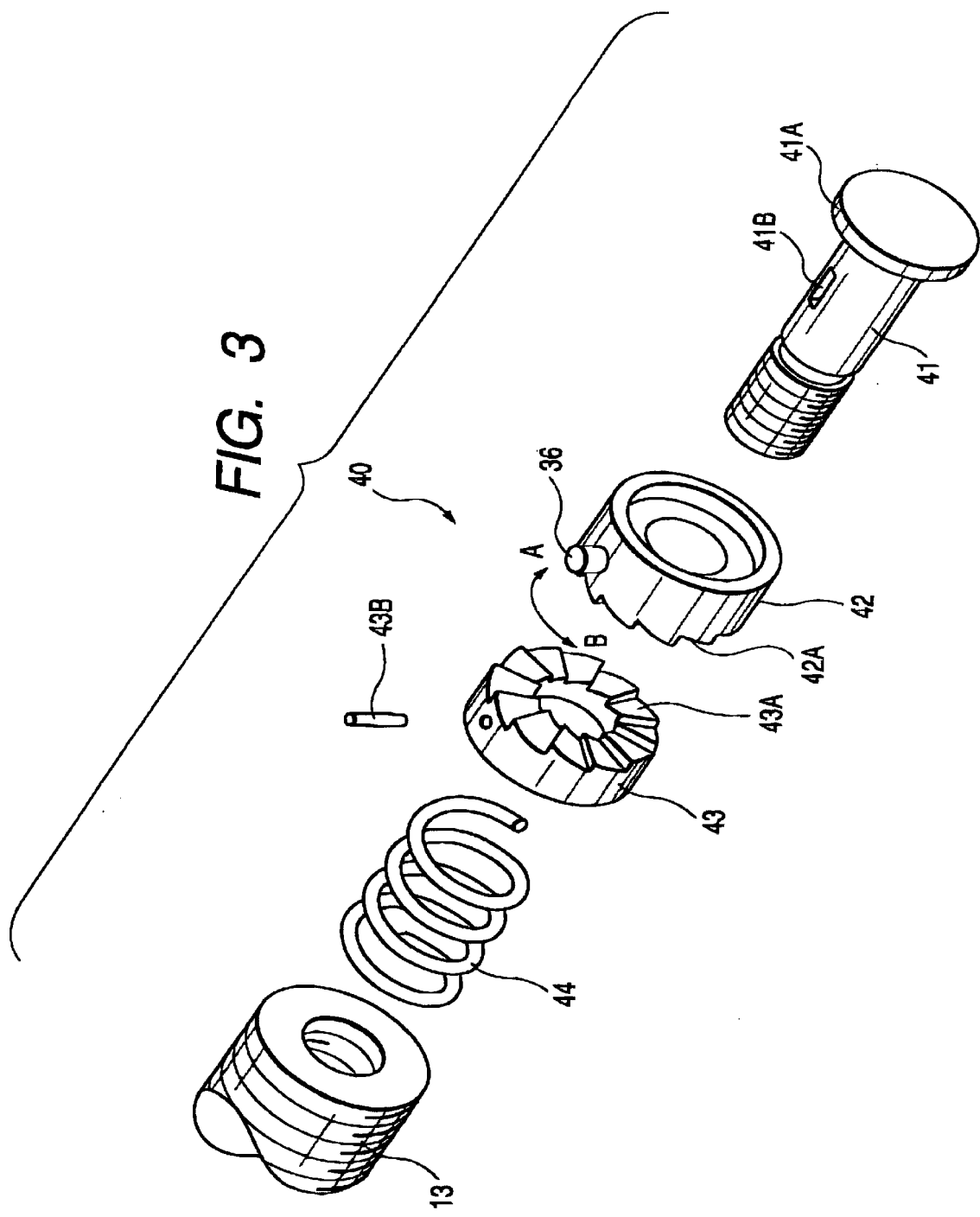
FIG. 3 is an exploded perspective view showing a constant-pressure mechanism of the micrometer according to the embodiment.

As shown in FIGS. 2 and 3, the constant-pressure mechanism 40 is structured by a support shaft 41, a first rotation transmission ring 42, a second rotation transmission ring 43 and a coil spring 44. The support shaft 41 is screwed to the opposite end of the spindle 13 (a base end on the assumption that a front end is on the anvil 12 side) coaxially with the spindle 13. The first rotation transmission ring 42 is placed on the support shaft 41 rotatably with respect to the support shaft 41 and has the engagement pin 36 on the outer peripheral surface. The second rotation transmission ring 43 is placed on the support shaft 41 unrotatably and axially movably by a predetermined distance with respect to the support shaft 41. The coil spring 44 acts as urging means which urges the second rotation transmission ring 43 toward the first rotation transmission ring 42.

The support shaft 41 is formed with a flange 41A abutting the first rotation transmission ring 42 so as to prevent the ring 42 from slipping out and is formed in the outer peripheral surface with a groove 41B along the axial direction. A pin 43B projectingly provided in the second rotation transmission ring 43 is slidably engaged with the groove 41B, whereby the second rotation transmission ring 43 is placed on the support shaft 41 unrotatably and axially movably by a predetermined distance with respect to the support shaft 41.

The first rotation transmission ring 42 and the second rotation transmission ring 43 are respectively formed on faces opposed to each other with serrated protrusions (ratchets) 42A and 43A engaging with each other in the circumferential direction.

Figure 4:
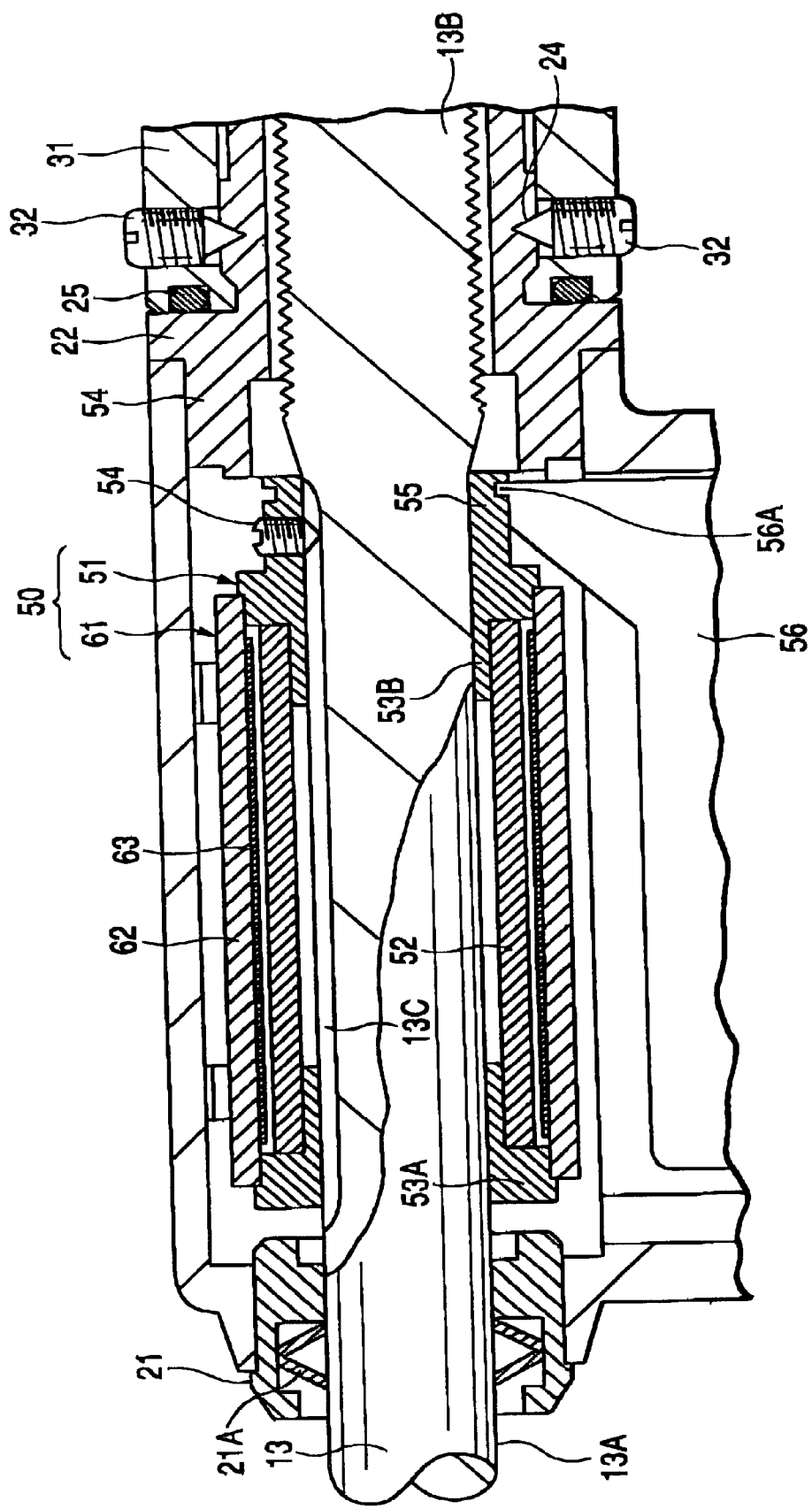
FIG. 4 is an enlarged view showing a displacement sensor portion of the micrometer according to the embodiment.

Disposed between the bushing 21 and the sleeve 22 is a cylindrical displacement sensor 50 as an encoder for detecting the axial displacement amount of the spindle 13 from the rotation amount thereof. As shown in FIG. 4, the cylindrical displacement sensor 50 has a rotor 51 which can be rotated with the spindle 13 and has an outer peripheral wall face of a circular configuration, a stator 61 which is placed with a predetermined gap between the stator 61 and the outer peripheral wall face of the rotor 51 and has an inner peripheral wall face of a semicircular configuration, and urging means (not shown) for urging the stator 61 toward the rotor 51.

The rotor 51 and the stator 61 are formed with electrodes (not shown). That is, a transmission electrode group having a plurality of electrodes to which AC signals different in phase are applied and a receiver electrode insulated from the transmission electrode group and having a receive signal input to a measuring circuit are disposed on the inner peripheral wall face of the stator 61. A coupling electrode capacitively coupling with more than one electrode of the transmission electrode group at the same time is disposed on the outer peripheral wall face of the rotor 51.

The rotor 51 includes a cylinder member 52 with the coupling electrode disposed on the outer peripheral wall face and end members 53A and 53B made of resin having wear resistance and fitted to both ends of the cylinder member 52. A set screw 54 whose tip point part slidably engages with the groove 13C of the spindle 13 is screwed into the end member 53B, and an annular groove 55 is also formed in the end member 53B. A tip engagement part 56A of a member 56 provided integrally in the frame 11 is slidably engaged in the annular groove 55, whereby the rotor 51 is rotated in conjunction with the rotation of the spindle 13, and even if the spindle 13 displaces axially, the rotor 51 is not prevented from moving axially.

The stator 61 includes a semicylindrical body 62 and an FPC board 63 attached to the inner peripheral wall face of the semicylindrical body 62 and formed on the surface thereof with the transmission electrode group and the receiver electrode as a pattern.

In the measurement of the micrometer thus structured, for example, if the operator holds a measured object (not shown) by left hand, grasps the frame 11 by right hand, and rotates the thimble 31 with the thumb and forefinger of the right hand, the rotation of the thimble 31 is transmitted to the spindle 13 through the guide groove 35, the engagement pin 36, and the constant-pressure mechanism 40. Then, the spindle 13 is displayed axially while rotating because the spindle 13 is screwed into the internal thread 23 placed on the frame 11 side. At this time, when the spindle 13 rotates, the rotor 51 also rotates with respect to the stator 61, thus the rotation amount of the rotor 51 is detected on the electrode of the sensor 50, then is digitally displayed on the digital display 14.

After the spindle 13 is displaced away from the anvil 12 (at this time, the first rotation transmission ring 42 is rotated in the B direction in FIG. 3), the spindle 13 is displaced toward the anvil 12 (at this time, the first rotation transmission ring 42 is rotated in the A direction in FIG. 3) and the measured object is sandwiched between the anvil 12 and the spindle 13.

Then, the spindle 13 cannot be displaced any more toward the anvil 12, namely, cannot rotate toward the anvil 12. Thus, when the first rotation transmission ring 42 of the constant-pressure mechanism 40 rotates in the A direction in FIG. 3, the second rotation transmission ring 43 displaces away from the first. rotation transmission ring 42 while compressing the coil spring 44. Therefore, the first rotation transmission ring 42 races with respect to the second rotation transmission ring 43 and the rotation of the first rotation transmission ring 42 is not transmitted to the second rotation transmission ring 43. Thus, when the display value on the display 14 is read at this time, measurement can be executed in the state of constant measuring pressure.

According to the embodiment, in the micrometer with the thimble 31 rotating at the constant position, the guide groove 35 is formed in the inner peripheral surface of the thimble 31 and the engagement pin 36 slidably engaging with the guide groove 35 of the thimble 31 is projectingly provided at the base end of the spindle 13, so that the rotation of the thimble 31 can be transmitted to the spindle 13 through the guide groove 35 and the engagement pin 36.

Therefore, the rotation of the thimble can be transmitted to the spindle without forming a V groove, etc., along the axial direction of the outer peripheral surface of the spindle as in the related micrometer. Thus, the disadvantage involved in the V groove, namely, the disadvantage that the V groove acts as a tap for thread working and a clearance is produced between the external thread and the internal thread, causing the degradation of the precision of the micrometer can be overcome. Therefore, superior precision can be guaranteed over a long term.

Since the thimble 31 is rotatably placed at the constant position of the frame 11, even if the spindle 13 is displaced largely, a problem of degrading the operability does not arise. Since the main scale graduation, the vernier scale graduation, and the like of the related micrometer are omitted, the outer sleeve for forming the main scale graduation can also be made unnecessary. Therefore, the costs involved in working the parts can be reduced and the number of parts and the number of assembly steps can be decreased, so that the costs can be reduced.

The constant-pressure mechanism 40 which races the engagement pin 36 with respect to the spindle 13 when a predetermined or more load is applied to the spindle 13 is disposed between the spindle 13 and the engagement pin 36. Thus, if a measured object is sandwiched between the spindle 13 and the anvil 12 and a predetermined or more load is applied to the spindle 13, the thimble 31 races with respect to the spindle 13, so that measurement can always be executed under constant measuring pressure. Thus, highly precise measurement can be guaranteed.

The constant-pressure mechanism 40 includes the support shaft 41 disposed on the base end of the spindle 13, the first rotation transmission ring 42 rotatably disposed on the support shaft 41 and having the engagement pin 36 on the outer peripheral surface and the serrated protrusion (ratchet) 42A on the side, the second rotation transmission ring 43 disposed on the support shaft 41 unrotatably and axially movably by a predetermined distance with respect to the support shaft 41 and having the serrated protrusion (ratchet) 43A engaging the serrated protrusion 42A on the side, and the coil spring 44 for urging the second rotation transmission ring 43 toward the first rotation transmission ring 42. Thus, the measuring pressure can be changed to any desired magnitude by replacing the coil spring 44. Therefore, the measuring pressure can be changed easily.

The thimble 31 includes the cylindrical body 33 rotatably supported with respect to the outer periphery of the sleeve 22 about the axis of the spindle 13, and the cap 34 integrally formed at the opposite end of the cylindrical body 33 and having the guide groove 35 in the inner peripheral surface. In addition, the cylindrical body 33 and the cap 34 are made integrally of a synthetic resin. Thus, weight can be saved and the number of parts can be reduced. In this connection, they are discrete parts in U.S. Pat. No. 5,829,155 of the applicant previously described.

Moreover, since the spindle 13 can be hermetically sealed on the opposite end side, a dustproof and waterproof structure can be provided as a simple structure. In addition, the seal member 21A is located in the bushing 21 of the frame 11 supporting the spindle 13 and the seal member 25 is intervened in the joint portion of the sleeve 22 and the thimble 31. Thus, the dustproof and waterproof properties in the frame 11 can be enhanced. Therefore, the adverse effect on the sensor 50 can be excluded as much as possible.

The constant-pressure mechanism 40 is not limited to the structure previously described in the embodiment and may be any other structure.

Figure 5:
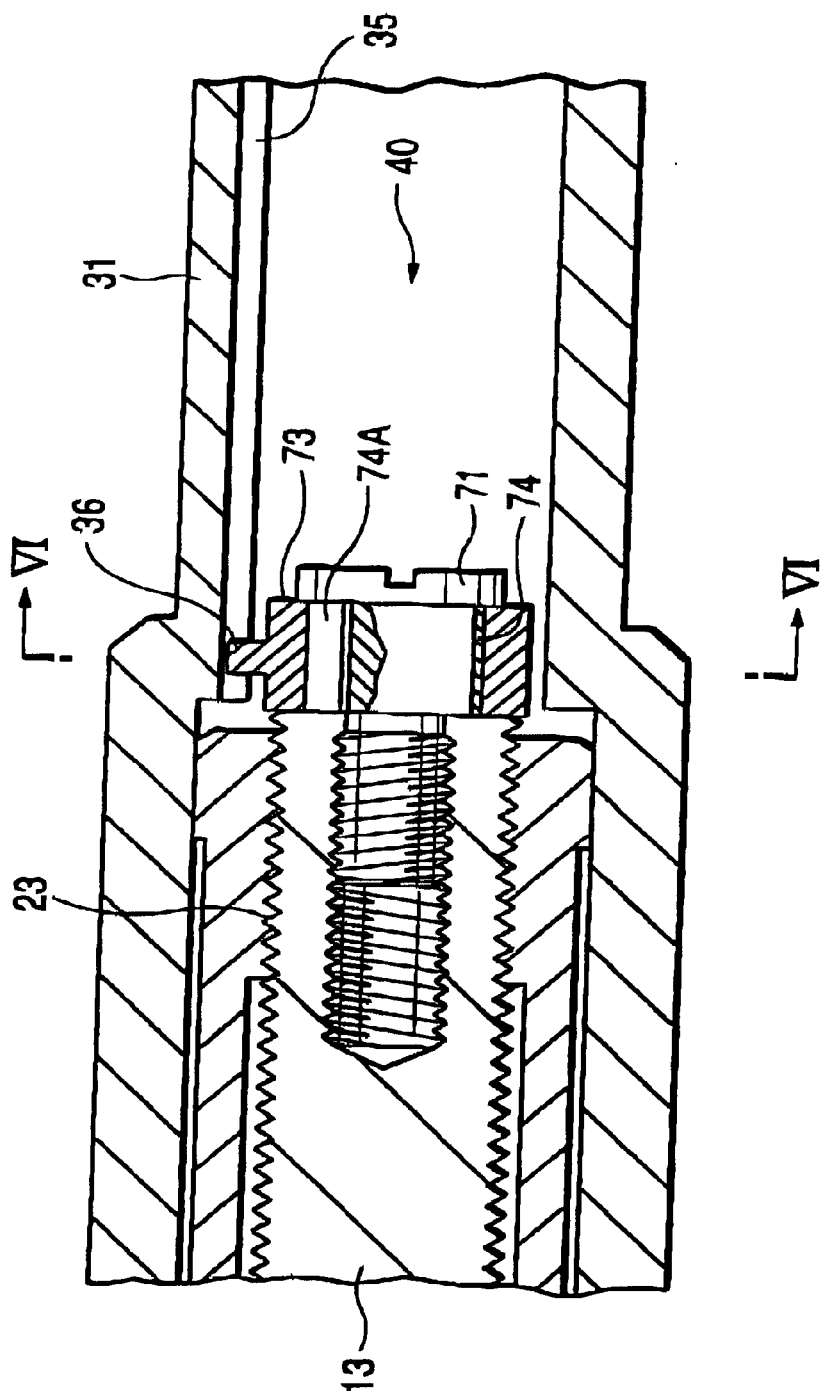
FIG. 5 is an enlarged view showing another constant-pressure mechanism portion of the micrometer according to the invention.
Figure 6:
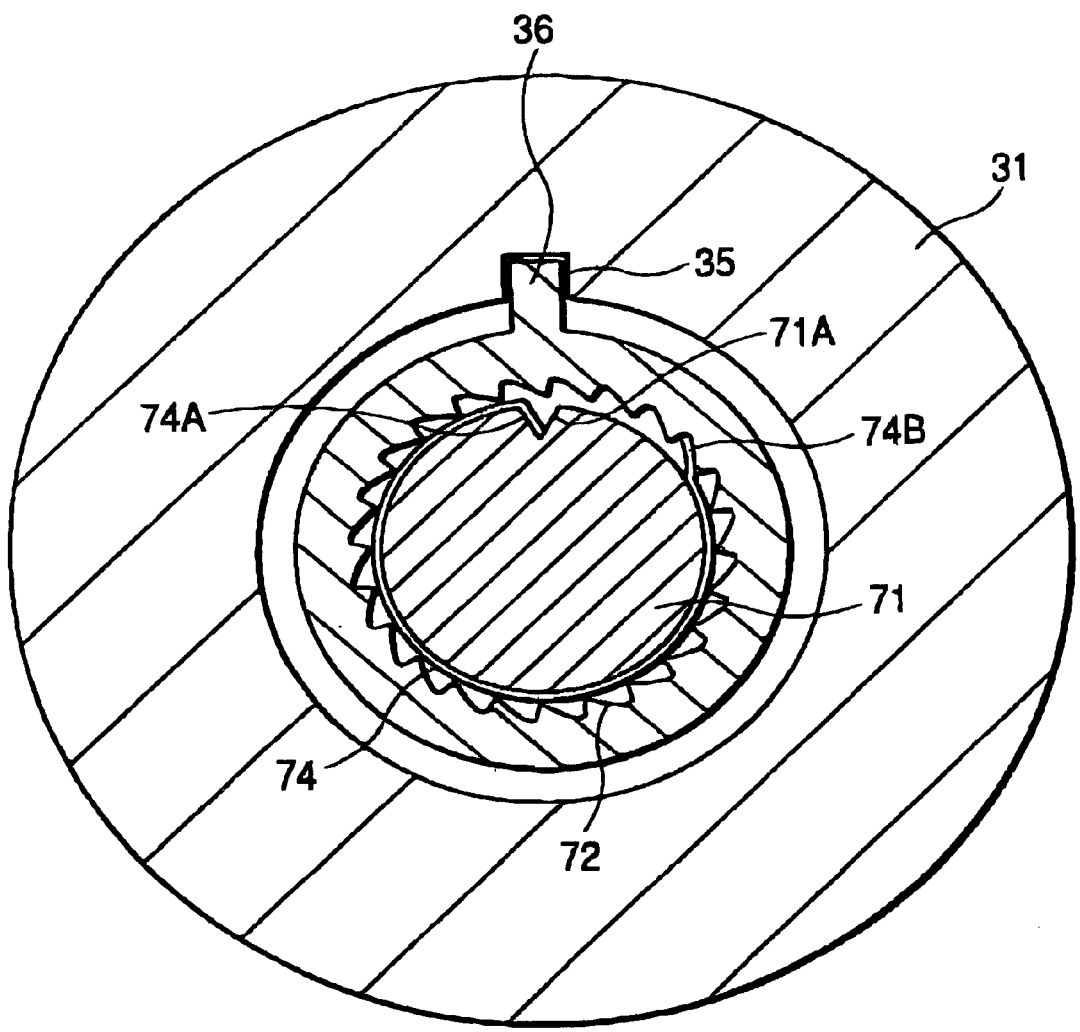
FIG. 6 is an enlarged sectional view taken on line VI—VI in FIG. 5.
Figure 7:
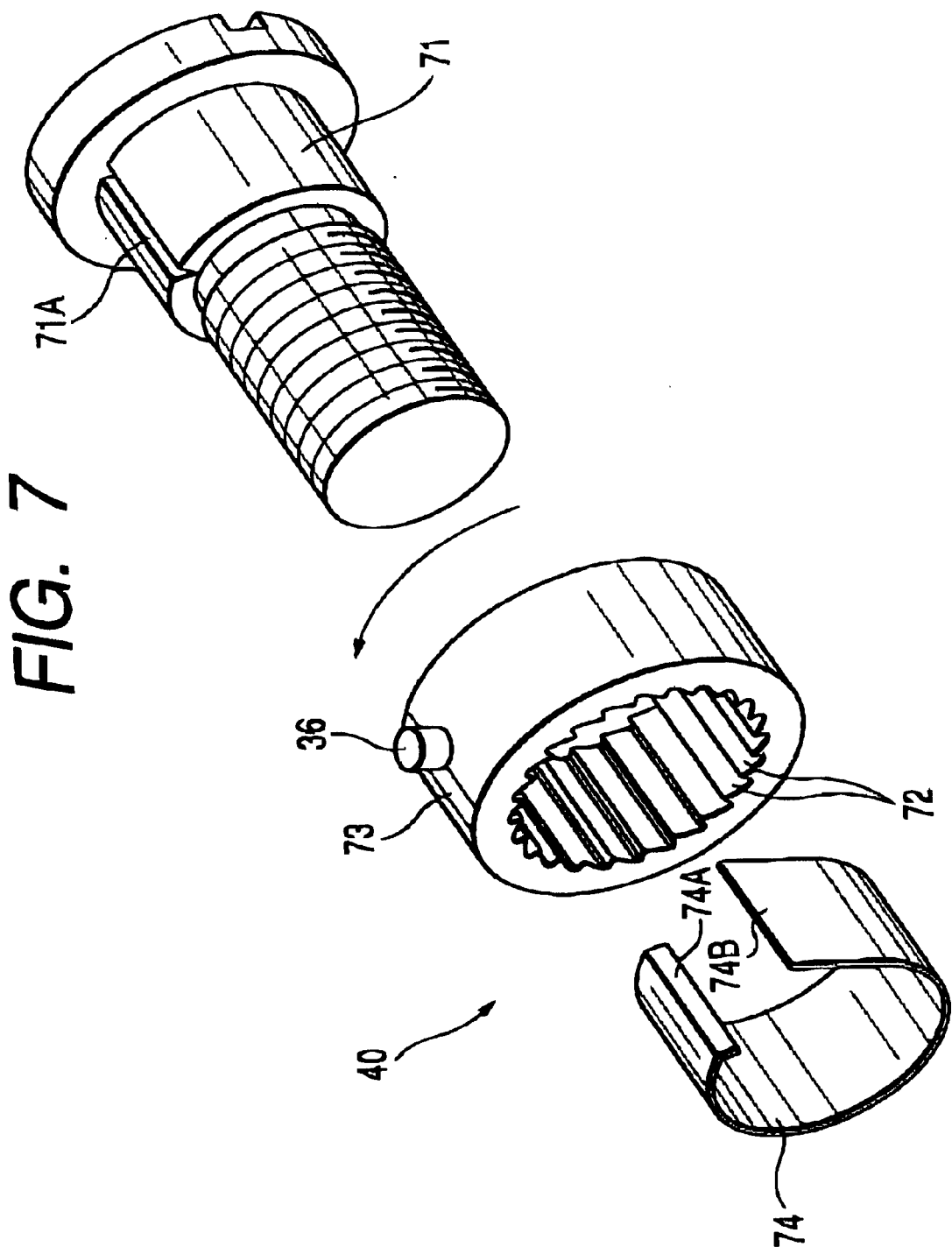
FIG. 7 is an exploded perspective view showing a constant-pressure mechanism in FIG. 5.

For example, the constant-pressure mechanism 40 may have a structure shown in FIGS. 5 to 7. The constant-pressure mechanism 40 includes a support shaft 71, a ratchet ring 73 and a coil spring 74. The support shaft 71 is screwed to the base end of the spindle 13 coaxially with the spindle 13. The ratchet ring 73 rotatably disposed on the outside of the support shaft 71 and has the engagement pin 36 on the outer peripheral surface and a serrated protrusion 72 on the inner peripheral surface. The coil spring 74 is inserted between the ratchet ring 73 and the support shaft 71, one end 74A of the coil spring 74 is retained in an outer peripheral groove 71A of the support shaft 71 and an opposite end 74B of the coil spring 74 is pressed and urged against a serrated protrusion 72 of the ratchet ring 73.

Also in the structure, when a measured object is sandwiched between the anvil 12 and the spindle 13 and a predetermined or more load is applied to the spindle 13, the ratchet ring 73 races while urging the opposite end 74B of the plate spring 74, so that measurement can be executed under constant measuring pressure.

According to the structure, since the constant-pressure mechanism 40 is structured with the three parts of the support shaft 71, the ratchet ring 73 and the plate spring 73, the number of parts is small, assembly is also easy, and the costs can be reduced.

The encoder is not limited to that of electrostatic capacity type previously described in the embodiment and may be of any other type, such as photoelectric type or magnetic type.

In the embodiment, the frame 11 is provided with the digital display 14, but a detection signal of the encoder may be output to any other display.

According to the invention, in a micrometer of a type wherein a spindle displaces in the axial direction during the rotation, high precision can be guaranteed over a long term while maintaining the advantages of cost reduction and operability.

The present disclosure relates to the subject matter contained in Japanese Patent application No. Hei. 10-91744 filed on Apr. 3, 1998 which is expressly incorporated herein by reference in its entirely.

What is claimed is:

1. A micrometer comprising:

a main body having an anvil at one end thereof;

a spindle having a screwed portion engaging an opposite end of said main body and being displaceable in an axial direction and with respect to said anvil in conjunction with rotation of said spindle;

a thimble provided on the opposite end of said main body, said thimble being rotatable about the axis of said spindle at a predetermined position in the axial direction of said spindle; and an encoder detecting an axial displacement amount of said spindle from a rotation amount of said spindle, so that a measurement value based on an output signal of said encoder is digitally displayed, wherein said thimble is formed with a guide groove parallel with the axial direction of said spindle in an inner peripheral surface thereof, and said spindle includes an engagement portion located in said spindle and slidably engaging with said guide groove of said thimble.

2. The micrometer as claimed in claim 1, further comprising:

a constant-pressure mechanism for causing said engagement portion to be raced with respect to said spindle when a predetermined or more load is applied to said spindle, said constant-pressure mechanism being provided between said spindle and said engagement portion.

3. The micrometer as claimed in claim 2, wherein said constant-pressure mechanism includes:

a support shaft disposed on a base end of said spindle coaxially therewith;

a first rotation transmission ring rotatably provided on said support shaft and having said engagement portion on an outer peripheral surface and a first serrated protrusion on a side thereof along a circumferential direction;

a second rotation transmission ring provided on the support shaft unrotatably and axially movably with respect to said support shaft, said second rotation transmission ring having a second serrated protrusion along a circumferential direction on a side opposed to said first serrated protrusion of said first rotation transmission ring, said second serrated protrusion engaging with said first serrated protrusion of said first rotation transmission ring; and an urging unit urging said second rotation transmission ring toward said first rotation transmission ring.

4. The micrometer as claimed in claim 3, wherein said engagement portion is an engagement pin projectingly provided on the outer peripheral surface of said first rotation transmission ring.

5. The micrometer as claimed in claim 3, wherein said support shaft is screwed into the base end of said spindle, and said urging unit is a coil spring disposed between the base end of said spindle and said second rotation transmission ring and about said support shaft so as to urge said second rotation transmission ring toward said first rotation transmission ring.

6. The micrometer as claimed in claim 2, wherein the constant-pressure mechanism includes:

a support shaft disposed on a base end of said spindle coaxially therewith;

a ratchet ring rotatably provided on an outside of said support shaft and having said engagement portion on an outer peripheral surface and a serrated protrusion on an inner peripheral surface, and a plate spring inserted between the inner peripheral surface of said ratchet ring and an outer peripheral surface of said support shaft, said plate spring including one end retained in the outer peripheral surface of said support shaft and an opposite end pressed and urged against said serrated protrusion of said ratchet ring.

7. The micrometer as claimed in claim 1, wherein said thimble comprises a cylindrical body rotatably supported about the axis of said spindle on said opposite end side of said main body, and a cap having said guide groove in an inner peripheral surface and closing one end of said cylindrical body, said cylindrical body and said cap being integrally made of resin.

8. The micrometer as claimed in claim 7, wherein a seal member is intervened in a joint part between said main body and an opening of the cylindrical body opposite to said cap.

9. The micrometer as claimed in claim 1, wherein said main body is constructed by a substantially U-shaped frame, said frame includes a digital display displaying the measurement value.

* * * * *